United States Patent [19]

Anderson et al.

[11] Patent Number: 4,570,662

[45] Date of Patent: Feb. 18, 1986

[54] DEMAND RESPONSIVE FLOW CONTROL VALVE

[75] Inventors: Stanley E. Anderson, Saginaw; Leonard N. Franklin, Jr., Reese, both of Mich.

[73] Assignee: General Motors Corporation, Detroit, Mich.

[21] Appl. No.: 598,481

[22] Filed: Apr. 9, 1984

[51] Int. Cl.$^4$ .............................................. G05D 7/01
[52] U.S. Cl. .................................................. 137/117
[58] Field of Search ....................... 137/115, 117, 109; 91/47, 51, 416, 417 R

[56] References Cited

U.S. PATENT DOCUMENTS

| | | | |
|---|---|---|---|
| 2,900,960 | 8/1959 | Gratzmuller | 91/417 R |
| 2,981,067 | 4/1961 | Clark et al. | 137/115 |
| 3,367,354 | 2/1968 | Gallant | 137/115 |
| 3,505,899 | 4/1970 | Dye | 74/499 |
| 4,505,293 | 3/1985 | Strange | 137/117 |

FOREIGN PATENT DOCUMENTS 136455  7/1952  Sweden ................. 137/115

Primary Examiner—Robert G. Nilson
Attorney, Agent, or Firm—Donald F. Scherer

[57] ABSTRACT

A demand responsive flow control valve mechanism has a valve member which receives fluid flow from a power steering pump and delivers a predetermined amount of fluid to an operating system such as the power steering gear. The excess fluid delivered by the pump is directed by the valve member to a bypass port from which the excess fluid is returned to the pump or a reservoir. The fluid flow to the operating system is controlled by differential areas disposed on a spool valve and a flow regulating orifice sensitive to system flow from determining the pressure differential to be applied to the differential areas. The operating system has a variable orifice which serves as a demand regulator for establishing the pressure level requirements for the pump. The valve spool responds to the pressure differential and system pressure level to bypass fluid as required. A pair of check valves are disposed in the spool valve and are operable to provide two stages of pressure relief for the operating system.

3 Claims, 1 Drawing Figure

U.S. Patent  Feb. 18, 1986  4,570,662
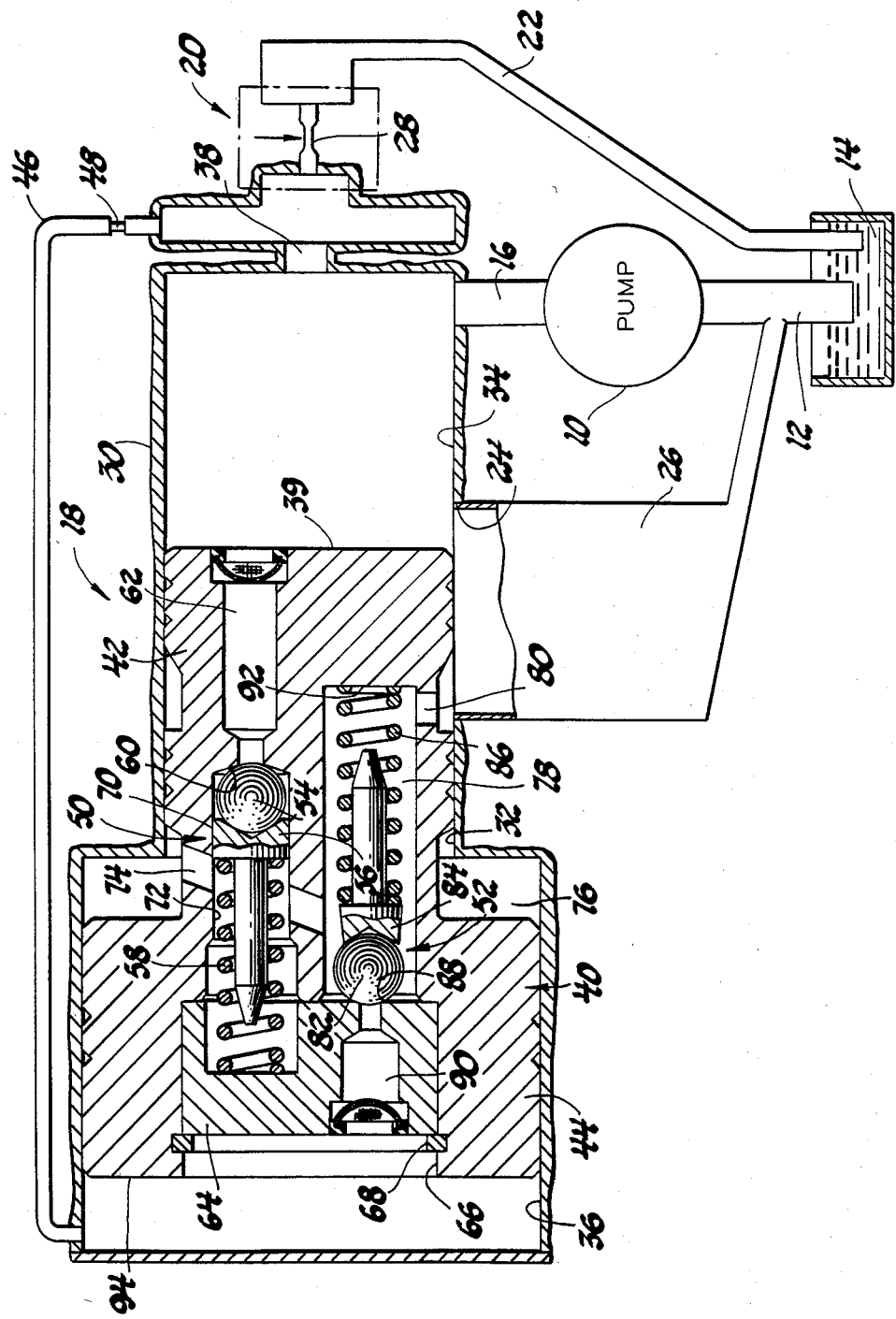

DEMAND RESPONSIVE FLOW CONTROL VALVE

This invention relates to flow control valve mechanisms and more particularly to demand responsive flow control valves.

It is an object of this invention to provide an improved demand responsive flow control mechanism wherein a spool valve has differential areas responsive to fluid pressure on the upstream and downstream sides, respectively, of a flow regulating orifice to limit the system flow and wherein a system demand regulated orifice is operable in part to establish the system pressure, and also wherein the spool valve has a pair of regulator valves cooperating therewith to establish a two-stage pressure relief for the system.

It is another object of this invention to provide an improved responsive flow control mechanism wherein a valve spool has three pressure responsive areas two of which, of unequal area, are opposed and connected to fluid flow on opposite sides of a flow regulating orifice, with the larger area being downstream, to regulate system flow by moving the valve spool to open a bypass port, and wherein a demand regulating orifice controls system pressure on the opposed areas to effect the proper bypass flow and also wherein a first check valve operates to admit system pressure to the third area to effectively balance the valve spool, and a second check valve acting in concert with a flow restriction is operable, at a predetermined pressure level, to limit the pressure on the larger area thereby controlling the bypass to establish the maximum system pressure.

These and other objects and advantages of the present invention will be more apparent from the following description. The drawing is a diagrammatic representation of a power steering system incorporating the present invention.

The power steering system includes a pump 10 which draws fluid through a passage 12 from a reservoir 14. The pump 10 delivers fluid pressure through a passage 16 to a flow control valve, generally designated 18, which in turn delivers the fluid through a power steering gear, designated 20. The power steering gear 20 returns fluid via passage 22 to the reservoir 14.

The flow control valve 18 has a bypass port 24 which is connected to a passage 26 for returning excess pump discharge flow to the reservoir 14 or to pump 10 through passage 12. The pump 10 and steering gear 20 are of conventional design. Therefore, those skilled in the art will be aware of the make-up and structure of these devices. It is possible to use a pump constructed in accordance with the teachings of U.S. Pat. No. 4,386,891 to Riefel et al issued June 7, 1983 or U.S. Pat. No. 4,373,871 to Christ issued Feb. 15, 1983. The steering gear may be constructed in accordance with U.S. Pat. No. 3,505,899 to Dye issued Apr. 14, 1970.

The pump 10 can be either the type having an integral reservoir or the type having a separated reservoir. The steering gear 20 can be either the integral type steering gear or a rack and pinion type steering gear. In either event, the steering gear 20 will include a variable demand orifice or restriction 28, which in the present system, will provide a demand regulator orifice for the flow control valve 18.

The flow control valve 18 includes a housing 30 having formed therein a stepped bore 32 with a small diameter portion or bore 34 and a large diameter portion or bore 36. The small diameter bore 34 is in fluid communication with the bypass port 24 and has disposed at one end thereof, a flow regulating orifice or restriction 38 through which fluid flow to the steering gear 20 must pass.

The bore 32 has slidably disposed therein a valve spool 40 including a small diameter portion or land 42 slidably disposed in bore 34, and a large diameter portion or land 44 slidably disposed in the large diameter portion 36. The bore 34 and therefore the right end 39 of valve 40 is in fluid communication with the passage 16 of pump 10.

The bore 36 is in fluid communication with the discharge of pump 10 through passage 46 which is connected downstream of the flow regulating orifice 38. The passage 46 includes a restriction 48 which is disposed between the downstream side of orifice 38 and the large diameter portion 36.

The valve spool 40 has incorporated therewith a pair of check valves, generally designated 50 and 52. The check valve 50 includes a ball 54, a ball seat 56, a spring 58 and a valve seat 60. The valve seat 60 is formed integrally with the valve spool 40 and is connected through a passage 62 to the discharge pressure of pump 10 which is present in the bore 34. The spring 58 is compressed between the ball seat 56 and a plug member 64 secured in a bore 66, retained in valve spool 40 by a lock ring 68. The spring 58 determines the pressure which must be present in passage 62 before the ball 54 will move leftward away from the valve seat 60. The ball seat 56 has a cylindrical portion 70 which is slidably disposed in a valve fit relationship with a bore 72 formed in the valve spool 40.

The bore 72 is intersected by a cross drilled passage 74 which is also in communication with an area 76 formed by the difference in the diameters of lands 42 and 44. The cross drilled passage 74 and therefore area 76, will be placed in fluid communication with the discharge of pump 10 through passage 62 when the check valve 50 has been moved sufficiently to the left so that cylindrical portion 70 has cleared the opening of passage 74. The passage 74 is also in fluid communication with a bore 78 which houses the check valve 52. The bore 78 is in fluid communication with the bypass port 24 through a passage 80. Therefore, the pressure in bore 78 will be equal to the pressure in bypass port 24. The pressure acting on area 76 will also be equal to the pressure in bypass port 24 except that, when the cylindrical portion 70 permits fluid communication of area 76 with the bore 62, communication between area 76 and bore 78 is discontinued by the closing of a portion of passage 74 between bores 72 and 78 by the cylindrical portion 70.

The check valve 52 includes a ball 82, a ball seat 84, a spring 86 and a valve seat 88. The valve seat 88 is formed integrally with the plug 64 and is in fluid communication through a passage 90 with the bore 36. The spring 86 is compressed between the ball seat 84 and a circular surface 92 formed at the end of bore 78. The pressure at which ball 82 will move rightward away from valve seat 88 is determined by the force in spring 86 which is, in turn, determined by the position of plug 64. By selecting the proper spring rates and spring sizes, the valves 50 and 52 can be designed to operate at different pressures.

During operation, the pump 10 supplies fluid pressure through the flow regulating orifice 38 to the steering gear 20. The fluid passes through the demand orifice 28 and back to the reservoir 14. The right end 39 of valve spool 40 is subjected to pump discharge pressure while the left end 94 of valve spool 40 is subjected to the system pressure downstream of the flow regulating orifice 38. As is well-known, the fluid pressure will increase due to flow through a restriction. With the initial flow from pump 10, the flow through orifice 38 will not be sufficient to significantly increase the pump discharge pressure such that ends 39 and 94 of valve 40 will be subjected to the same pressure. Due to the large area of end 94, valve spool 40 will move rightward to close the bypass port 24. As the bypass port 24 closes, pump discharge pressure will tend to increase and the volume of pump discharge through orifice 38 and steering gear 20 will increase. The fluid flow will increase until the pressure acting upstream of orifice 38 in combination with the area of end surface 39 is sufficient to cause the valve spool 40 to open the bypass port 24 against the force of the fluid pressure downstream of orifice 38 acting on the area of end 94 of valve spool 40.

If the vehicle is being driven straight, that is no steering maneuver is present, the pressure loss through demand orifice 28 will be minimum. Therefore, the back pressure or the system idle pressure on pump 10 will be minimum such that overall system losses will be very low. When a steering maneuver is undertaken by the operator, the demand orifice 28 will decrease causing an increase in the discharge pressure from pump 10. This increased pressure is communicated via passage 46 and bore 34 to the respective areas of ends 39 and 94, and since the area of end 94 is larger, this will result in rightward movement of spool 40, decreasing the opening of bypass port 24 and thereby increasing the discharge flow through the orifice 38. The valve spool 40 will move rightward until the flow through regulating orifice 38 satisfies the pressure requirements for the respective areas of the ends 39 and 94 of valve spool 40.

As the steering force required increases, the demand orifice 28 will be decreased due to increased operator input. At a predetermined pressure level, representing the maximum desirable steering force, the valve 50 will be unseated into moving leftward in bore 70 until fluid pressure is acting on area 76. At this time, the valve spool 40 will be balanced since the area of end surface 39 plus the area 76 will be equal to the area of end surface 94. The valve spool 40 will thereby move quite freely should excess fluid flow need to be bypassed. However, it should be appreciated at this time that the orifice 38 must continue to be satisfied. If the operator continues to request steering demand, the demand orifice 28 will be completely closed. This can occur when the steering gear mechanism has reached either the left or right stop position or the turning wheel of the vehicle is against a barrier such as a curb.

When the demand orifice 28 is completely closed or substantially closed, the check valve 52 will unseat permitting fluid flow from the bore 36 through bore 78 and passage 80 to the bypass port 24. As fluid flows from the bore 36, a pressure drop in passage 46 will occur at the restriction 48. Due to flow through restriction 48, a pressure unbalance between the areas of valve end 39 and area 76 and the area of end 94 will occur. A resultant leftward force on the valve spool 40 will be present to permit opening of the bypass port 24. This increased opening of bypass 24 is required since fluid flow through the flow regulating orifice 38 will be minimum.

At this time, the flow regulating function will be taken away from regulating orifice 38 and provided by the restriction 48. Since the restriction 48 is considerably smaller than orifice 38, a much smaller fluid flow will create the desired pressure differential between the right facing areas of area 76 and the area of end 39 and the left facing area of the end 94.

It should be noted that the demand responsive flow regulator valve described above does not include a spring member to urge the valve spool 40 to close the bypass port 24. Those skilled in the art will recognize that with a conventional flow type regulator valve such a spring is necessary. The use of a spring member requires a larger minimum system pressure such that when a steering demand is not present, the system pressure operates at a level greater than the pressure level necessary with the present invention.

Accordingly, the present invention will provide improved efficiency and increased economy over the prior art flow responsive systems.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A demand responsive flow controlling valve mechanism for use in a hydraulic fluid pump system having a flow regulating orifice and a demand regulated orifice, said valve mechanism comprising a slidable valve member with a first pressure responsive area subjected to pump pressure upstream of both orifices, a second and larger pressure responsive area subjected to system pressure downstream of said flow regulating orifice and upstream of said demand regulated orifice, a third pressure responsive area equal in size to the difference of said first and second pressure responsive areas, first regulator valve means for connecting said third pressure responsive area to said pump discharge pressure when said pump discharge pressure reaches a predetermined value and for permitting communication of said third pressure responsive area to exhaust when said pump discharge pressure is below said predetermined value, second regulator valve means for limiting the pressure operable on said second pressure responsive area at a higher pump discharge pressure, and a bypass port controlled by said slidable valve member, said valve mechanism being responsive to the pressure forces acting in opposition on said first and second pressure responsive areas to open said bypass port for the bypassing of excess pump discharge as determined by said flow regulating orifice when said demand regulated orifice is fully opened, said valve mechanism reducing the bypass port opening as pressure demand increases with a closing of said demand regulated orifice, said valve mechansim being substantially pressure balanced at said first predetermined pressure value, and said valve mechanism opening for bypassing of substantially all of the pump discharge when the higher pump discharge pressure is reached.

2. A demand responsive flow controlling valve mechanism for use in a hydraulic fluid pump system having a flow regulating orifice and a demand regulated orifice, said valve mechanism comprising a slidable valve member with a first pressure responsive area subjected to pump pressure upstream of both orifices, a second and larger pressure responsive area subjected to system pressure downstream of said flow regulating orifice and upstream of said demand regulated orifice, a third pressure responsive area equal in size to the difference of said first and second pressure responsive areas, first ball check regulator valve means for connecting said third pressure responsive area to said pump discharge pressure when said pump discharge pressure reaches a predetermined value, said first ball check regulator valve means including a bore, a cylindrical ball seat slidably disposed in the bore, a ball, a valve seat and a spring urging the ball against the valve seat in opposition to pump pressure, second ball check regulator valve means for limiting the pressure operable on said second pressure responsive area at a higher pump discharge pressure, said second ball check regulator valve means including a bore, a ball disposed in said bore, a valve seat and a spring urging said ball against said seat in opposition to the pressure downstream of said flow regulating orifice, a bypass port controlled by said slidable valve member, said valve mechanism being responsive to the pressure forces acting in opposition on said first and second pressure responsive areas to open said bypass port for the bypassing of excess pump discharge as determined by said flow regulating orifice when said demand regulated orifice is fully opened, said valve mechanism reducing the bypass port opening as pressure demand increases with a closing of said demand regulated orifice, said valve mechanism being substantially pressure balanced at said first predetermined pressure value, and said valve mechanism opening for bypassing of substantially all of the pump discharge when the higher pump discharge pressure is reached, and a passage connecting said bores of both of said ball check regulator valve means and the third pressure responsive area with said bypass port, and said cylindrical ball seat being operable to disconnect said first mentioned bore from said bypass port when said ball is moved to connect said third pressure responsive area with the pump pressure.

3. A demand responsive flow controlling valve mechanism for use in a hydraulic fluid pump system having a flow regulating orifice and a demand regulated orifice, said valve mechanism comprising a slidable valve member with a first pressure responsive area subjected to pump pressure upstream of both orifices, a second and larger pressure responsive area subjected to system pressure downstream of said flow regulating orifice and upstream of said demand regulated orifice, a third pressure responsive area equal in size to the difference of said first and second pressure responsive areas, first regulator valve means for connecting said third pressure responsive area to said pump discharge pressure when said pump discharge pressure reaches a predetermined value, second regulator valve means for limiting the pressure operable on said second pressure responsive area at a higher pump discharge pressure, a bypass port controlled by said slidable valve member, said valve mechanism being responsive to the pressure forces acting in opposition on said first and second pressure responsive areas to open said bypass port for the bypassing of excess pump discharge as determined by said flow regulating orifice when said demand regulated orifice is fully opened, and means including an exhaust passage and said first regulator valve means for controlling fluid communication of said third area with said bypass port, said valve mechanism reducing the bypass port opening as pressure demand increases with a closing of said demand regulated orifice, said valve mechanism being substantially pressure balanced at said first predetermined pressure value, and said valve mechanism opening for bypassing of substantially all of the pump discharge when the higher pump discharge pressure is reached.

* * * * *